Patented July 6, 1948

2,444,643

UNITED STATES PATENT OFFICE 2,444,643

POLYMERIZATION OF BUTADIENE-1,3 HYDROCARBONS IN ACIDIC AQUEOUS EMULSION IN THE PRESENCE OF A PERSULFATE AND ALUMINUM CHLORIDE

Charles F. Fryling, Akron, Ohio, assignor to The B. F. Goodrich Company, New York, N. Y., a corporation of New York No Drawing. Application April 12, 1944, Serial No. 530,724

3 Claims. (Cl. 260—86.5)

This invention relates to improvements in the production of synthetic rubber by the aqueous emulsion polymerization of butadiene-1,3 hydrocarbons and particularly to a method whereby butadiene-1,3 hydrocarbons are rapidly polymerized in aqueous emulsions which are acid in character, to form stable fluid synthetic rubber latices containing synthetic rubbers of excellent properties.

The production of synthetic rubber by the emulsion polymerization of butadiene-1,3 hydrocarbons has heretofore generally been effected in an alkaline medium employing soaps and similar materials which give alkaline emulsions as the emulsifying agents. Although the use of emulsifying agents which give acid emulsions such as the salts of high molecular weight aliphatic amines and the like, is known and is said to be desirable from the standpoint both of polymerization rate and of properties of the synthetic rubber produced, it has nevertheless proved to be extremely difficult to adapt such acid polymerizations to a practical commercial process. This difficulty has arisen principally because of the fact that precoagulation of the emulsion occurs during the polymerization with the result that a considerable deposit of coagulum builds-up on the walls of the polymerization vessel, and the latices obtained are extremely viscous and unstable and are consequently incapable of being subjected readily to the necessary handling operations.

It is an object of the present invention to provide a method of preventing the occurrence of troublesome precoagulation during the polymerization of butadiene-1,3 hydrocarbons in aqueous emulsions comprising emulsifying agents which give acid emulsions. Further objects of the invention are to produce fluid and stable synthetic rubber latices containing such emulsifying agents, and to provide an efficient and practical method of coagulating such latices to produce a synthetic rubber coagulum in an easily handled form. Still other objects include the development of an efficient and economical polymerization process wherein butadiene-1,3 hydrocarbons are polymerized in acidic aqueous emulsions at an improved rate to yield synthetic rubber products of improved quality. Other objects will appear hereinafter.

I have discovered that the above and other objectives are obtained when, in polymerizing butadiene-1,3 hydrocarbons either alone or in admixture with copolymerizable compounds such as styrene and acrylonitrile in an aqueous emulsion containing an emulsifying agent which gives acidic emulsions, a small amount of a water-soluble salt comprising a cation of a polyvalent metal is included in the emulsion during the polymerization.

Although any water-soluble salt comprising a cation of a polyvalent metal may be employed in the method of this invention and prevention of precoagulation during polymerization effected thereby, it is preferred that water-soluble salts of polyvalent metals having an acid reaction, that is, salts which hydrolyze in water to give an acidic solution, be employed. Such salts which are composed of polyvalent metal cations, particularly metal cations of a valence of more than two and especially trivalent metal cations occurring above hydrogen in the electrochemical series; and of univalent anions, particularly univalent anions of strong mineral acids, are especially preferred since in many cases it has been found that such salts in addition to their function in preventing precoagulation also function as catalysts and even as modifiers for the polymerization as will hereinafter appear. Specifically, such salts as aluminum chloride, aluminum bromide, aluminum nitrate, aluminum sulfate, aluminum acetate, aluminum lactate, aluminum sodium chloride and other water-soluble salts comprising an aluminum cation may be employed with excellent results; other salts which may also be employed to advantage include ferric chloride, ferric nitrate, ferric bromide, chromic chloride, chromic nitrate, stannic chloride, titanium tetrachloride, cobaltic chloride, zinc chloride, zinc nitrate, cerium bisulfate, gallium trichloride, thorium nitrate, indium trichloride, zirconium tetrachloride and similar water-soluble, acid-reacting salts comprising a polyvalent (particularly a tervalent or tetravalent) cation occurring above hydrogen in the electrochemical series and a monovalent anion. Other water-soluble salts comprising a polyvalent cation such as the water-soluble salts of mercury, antimony and other metals are also included in the class of salts described but in general are not employed since the salts enumerated give better results.

The amount of the salt to be included in the butadiene-1,3 hydrocarbon emulsion will depend somewhat on the other ingredients present in the emulsion but in general the amount of the salt should be between about 0.01 and 2.0% based on the weight of the monomeric materials present in the emulsion, the smaller amounts of salt such as from 0.01 to 0.5% being generally preferred.

As mentioned above, the salts of the character described are employed according to this invention when the emulsifying agent present in the emulsion of the butadiene-1,3 hydrocarbon to be polymerized is one which yields an acid emulsion. In general such emulsifying agents are water-soluble acid salts of organic bases containing a hydrocarbon chain of at least 8 carbon atoms. Preferred examples of such emulsifying agents include the water-soluble mineral acid salts such as those of hydrochloric and sulfuric acid and also the water-soluble organic acid salts such as those of acetic and formic acids, of aliphatic amines containing an aliphatic hydrocarbon chain of at least 8 carbon atoms such as n-octyl amine, n-dodecyl amine, n-octadecyl amine, n-octadecenyl amines, n-octadecadienyl amines and similar primary aliphatic amines containing an aliphatic hydrocarbon chain of at least 8 carbon atoms, and also secondary and tertiary aliphatic amines containing an aliphatic hydrocarbon chain of at least 8 carbon atoms such as octadecyl dimethyl amine, dodecyl methyl amine, di-(n-octyl amine) and similar aliphatic amines containing a hydrocarbon chain of up to 24 or more carbon atoms as well as mixtures of such aliphatic amines such as those prepared from higher fatty acid mixtures obtained from coconut oil, palm oil or the like. Other emulsifying agents comprising water-soluble acid salts of organic bases containing a hydrocarbon chain of at least 8 carbon atoms include cetyl trimethyl ammonium bromide, dimethyl benzyl dodecyl ammonium chloride, octadecyl trimethyl ammonium bromide, dodecyl triethyl ammonium nitrate, the hydrochloride of diethylaminoethyloleylamide, the dimethyl sulfate of diethylamino ethylstearyl amide, and other salts of quaternary organic bases comprising a hydrocarbon chain of at least 8 carbon atoms, as well as other salts of organic bases of the character described such as cetyl piperidinium bromide and the like. Still other emulsifying agents yielding an acid emulsion may also be employed.

Best results are generally obtained when water-soluble acid salts of alkyl amines containing an alkyl group of at least 8 carbon atoms, such as dodecyl amine hydrochloride, or the like, is the emulsifier employed; and when the pH of the emulsion is between 4 and 7. The pH of the emulsion may be regulated by employing, in addition to the amine salt, varying amounts of the free amines themselves. For example the addition of an acid to an amine in an amount insufficient to effect complete neutralization provides an excellent emulsifier which gives an emulsion having a pH greater than is obtained with the amine salt alone. Alkyl amines from 50 to 95% neutralized with acid are the preferred emulsifiers, the emulsions obtained using such emulsifiers possessing a pH of from about 4 to 7.

The amount of the emulsifier employed may be varied widely depending on the ratio of water to monomeric material in the emulsion. Generally the use of about twice as much water as monomeric polymerizable material, and the use of from 1 to 5% by weight of emulsifier based on the polymerizable material, to form the emulsion is preferred, although it is to be understood that these values are not critical and that any emulsion comprising a monomeric butadiene-1,3 hydrocarbon emulsified in water with an emulsifying agent of the character described, regardless of proportions of the ingredients, may be employed.

As is apparent from the foregoing this invention involves essentially the polymerization of monomeric butadiene-1,3 hydrocarbons or mixtures thereof with copolymerizable monomers, in an aqueous emulsion containing an emulsifying agent of the character described and a water-soluble salt comprising a polyvalent cation of the character described. In addition to these essential ingredients of the emulsion, however, it is also possible and often desirable that one or more other substances be present in the emulsion during the polymerization.

Thus, initiators or catalysts of polymerization such as the peroxygen compounds including hydrogen peroxide, benzoyl peroxide, and the like and per salts such as potassium persulfate, ammonium persulfate, sodium perborate, potassium percarbonate and the like, either alone or in conjunction with polymerization activators and accelerators, may be present in the emulsion to be polymerized in order that the polymerization may be conducted in the shortest possible time, but it is to be understood that the presence of such substances is not essential to this invention and may be omitted entirely if desired.

Modifiers for the polymerization of butadiene-1,3 hydrocarbons, that is, substances which increase the plasticity and solubility of butadiene-1,3 polymers and copolymers prepared in their presence, may also be included in the emulsion. Thus, sulfur-containing compounds of the general formula $R\text{---}(S)_n\text{=}X$ wherein R is a monovalent organic radical having its monovalency on a carbon atom, $n$ is a small integer, generally less than five, and X is a monovalent residue capable of convalently bonding to sulfur, generally function as modifiers for butadiene-1,3 hydrocarbon polymerization and may be present in the emulsion. Aliphatic mercaptans containing at least 4 carbon atoms such as t-butyl mercaptan, n-octyl mercaptan, n-heptyl mercaptan, 2-methyl butane-thiol-2, 2-methyl-hexane-thiol-2, n-decyl mercaptan, n-dodecyl mercaptan or lauryl mercaptan, cetyl mercaptan, octadecyl mercaptan, triisobutyl mercaptan, and similar mercaptans containing up to 24 or more carbon atoms, and mixtures of these are preferred modifiers to be used in the polymerization of this invention, those containing at least 8 carbon atoms also being effective in accelerating the polymerization rate. However, other modifiers including the bis(alkyl xanthogens) such as bis-(isopropyl xanthogen) and the like, 2-mercaptothiazoles and their sulfides and polysulfides such as 4-phenyl-2-mercapto thiazole, bis(4-phenyl thiazyl-2) disulfide and the like, thiuram mono- and polysulfides such as tetramethyl thiuram disulfide and the like, other organic sulfides and disulfides such as dibenzoyl disulfide, tolyl trisulfide and the like and similar sulfur-containing compounds of the above general formula may also be employed.

Heretofore when modifiers of polymerization have been employed it has been generally necessary that they be present in amounts of about 0.5 to 1.0% based on the material to be polymerized in order that polymers of a plasticity and processability of the same order as that of natural rubber be produced, but quite surprisingly, it has been found that when modifiers, particularly mercaptans, are employed in the method of this invention, along with aluminum chloride and similar preferred polyvalent metal salts set forth above, excellent well-modified polymers are produced when only lesser amounts of modifier, from about 0.1 to 0.5% are present. Thus the use of the combination of a modifier with aluminum chloride or similar preferred polyvalent metal salts, produces a synergistic effect on the properties of the polymers obtained and enables excellent synthetic rubber products to be produced using only about half the amount of modifier as is necessary in the absence of the aluminum chloride. Moreover, it is even possible to obtain plastic and easily worked synthetic rubber products resembling natural crude rubber, in the absence of any modifier when aluminum chloride and similar preferred polyvalent metal salts are employed, thus indicating, quite surprisingly, that the aluminum chloride, in addition to its other functions, may perform the function of a polymerization modifier.

The polymerization of the monomeric material, such as a monomeric mixture of butadiene-1,3 and styrene, in an aqueous emulsion containing the above-described polyvalent metal salt and emulsifying agent, together if desired with initiators, catalysts or modifiers of polymerization or other substances added for some other purpose, is preferably effected in this invention by agitating the emulsion at a temperature of about 10 to 100° C., preferably from 30 to 50° C., for a time sufficient to at least partially convert the monomers present into polymers, preferably for a time sufficient to convert from 70 to 100% of monomers into polymers. The time required for about 70–80% conversion is about 10 to 20 hours at 30° C., and the time is reduced by about half for each 10 degree rise in temperature. If it is desired to terminate the polymerization at a time corresponding to less than about 100% conversion, say at about 70 to 90% conversion, as is often the case, this may be accomplished by the addition of polymerization inhibitors such as phenyl-beta naphthyl-amine, hydroquinone, and beta-naphthol, such substances also serving to stabilize the polymer produced against oxidation.

Alternative procedures in the polymerization process include the addition of any of the ingredient of the emulsion continuously or in stages during the polymerization, as well as the continuous addition of all the ingredients and the continuous removal of the products to effect a continuous polymerization process.

The products of the polymerization are obtained in the form of fluid latex-like dispersions comprising dispersed polymer particles. Such dispersions or latices are stable against coagulation and they may be treated in any desired manner or stored indefinitely before use. Thus they may be distilled to remove unpolymerized monomers present, if any, without troublesome coagulation occurring during the distillation. They may be stabilized against oxidation by the addition of antioxidants such as phenyl-beta-naphthylamine if the desired amounts of such substances are not already present. Moreover, they may be utilized as latices whether compounded or uncompounded in the production of synthetic rubber articles as by electrodeposition or coagulant dip process.

When it is desired to produce massive synthetic rubber from such latices, however, as is ordinarily the case, it is necessary to coagulate the latices. Although the coagulation may be accomplished by the general methods known to the art for acid dispersions, such as by addition of alcohol and salt, it has been found that coagulation is best effected and the coagulum is obtained in the form of easily handled crumbs, by the addition of water-soluble salts comprising polyvalent anions such as phosphate ($PO_4\equiv$), sulfate ($SO_4=$), carbonate ($CO_3=$) and oxalate ($C_2O_4=$) anions; water-soluble salts, particularly alkali metal salts, of strong mineral acids comprising polyvalent anions, such as sodium sulfate and trisodium phosphate being preferred.

In case the emulsifying agent employed is a partially neutralized aliphatic amine it may be desirable to wash the coagulum with acid to remove the free amine. However, if it is desirable to leave the free amine incorporated in the polymer, washing with acid is unnecessary.

The synthetic rubber products obtained by the foregoing procedure may of course be processed in the same general manner as natural rubber, and may be utilized either compounded or uncompounded, vulcanized or unvulcanized, for the same general purposes as is natural rubber. The vulcanizates obtained from the synthetic rubber produced in accordance with this invention have been found to be particularly outstanding in tensile strength and in resistance to flex-cracking, being superior in these respects to the vulcanizates obtained with similar synthetic rubbers polymerized in the conventional manner employing soaps as the emulsifying agents.

In order further to illustrate the method of producing synthetic rubber in accordance with this invention, the following examples are cited but it is to be understood that the invention is not restricted thereto. The parts are by weight.

*Example I*

75 parts of butadiene-1,3 and 25 parts of styrene are emulsified with 200 parts of water containing 5 parts of dodecyl amine and sufficient hydrochloric acid to convert 85% of the amine into dodecyl amine hydrochloride. After the addition of 0.03 part of aluminum chloride, 0.3 part of potassium persulfate and 0.3 part of n-dodecyl mercaptan, the emulsion is agitated for 17 hours at 30° C., it being observed that there is no precoagulation of the emulsion during the 17 hours polymerization time. The product obtained is a fluid, freely-flowing latex-like dispersion of a butadiene-1,3 styrene copolymer synthetic rubber. Upon addition of 2 parts of phenyl-beta naphthylamine in alcoholic solution to the dispersion, and coagulation of the dispersion by addition of a 2% aqueous solution of sodium sulfate, there is obtained, in 81% yield, a synthetic rubber coagulum in the form of finely divided crumbs, which are then washed and dried. The synthetic rubber obtained is quite coherent, strong, and easily milled, and is substantially completely soluble in benzene. When compounded in a typical tire tread recipe and vulcanized for 30 minutes at 290° F., an excellent vulcanizate having a tensile strength of over 3500 lbs./sq. in and over 700% elongation is obtained.

When the above example is repeated except that no aluminum chloride is present, a noticeable amount of precoagulation occurs during the polymerization and the latex obtained is viscous and unstable. Moreover, the product obtained in the absence of aluminum chloride is not so plastic, it is incompletely soluble in benzene and when compounded and vulcanized in the same manner it produces a vulcanizate having a tensile strength of only 2800 lbs./sq. in. and only a 550% elongation.

*Example II*

Example I is repeated except that 0.3 part of aluminum chloride is employed. After 16 hours at 30° C. a fluid low-viscosity latex is obtained from which there is secured a 77% yield of a synthetic rubber of the same high quality as that of Example I. When this example is repeated at a polymerization temperature of 40° C., only 8 hours are required for an 80% yield and when the temperature is increased to 50° C., a 79% yield is obtained in 4 hours.

Examples III and IV

Example I is again twice repeated employing, in place of the aluminum chloride, 0.2 part of zinc chloride and 0.2 part of ferric chloride, respectively. After 16 hours at 30° C., fluid stable latices containing an 85% yield of synthetic rubber, are obtained in each case, and there is no appreciable precoagulation during the polymerization.

Example V 75 parts of butadiene-1,3 and 25 parts of styrene containing 0.26 part of n-heptyl mercaptan as a modifier are emulsified with 200 parts of an aqueous solution having a pH of 6.5 and containing 5 parts of dodecyl amine, sufficient hydrochloric acid to neutralize 75% of the amine, 0.3 part of potassium persulfate and 0.3 part of aluminum chloride. The resulting emulsion is polymerized for 14 hours at 30° C. whereupon there is obtained, in the form of a fluid latex-like dispersion, a 63% yield of an excellent butadiene-1,3 styrene synthetic rubber which when vulcanized possesses a tensile strength of 4400 lbs./sq. in. and a 700% ultimate elongation.

Example VI

Example V is repeated employing a 2-methyl-hexane thiol-2 in place of n-heptyl mercaptan. After 14 hours at 30° C., there is obtained an 81% yield of a product having properties similar to those of the product of Example V.

Example VII 75 parts of butadiene-1,3 and 25 parts of acrylonitrile are polymerized under the conditions of Example I. A fluid latex containing an 80% yield of a strong resilient and resistant butadiene-1,3 acrylonitrile copolymer is obtained in about 15 hours.

While the invention has been hereinabove described with particular relation to the copolymerization of butadiene-1,3 and styrene, and of butadiene-1,3 and acrylonitrile, it is to be understood that the method of this invention is applicable to any polymerizable butadiene-1,3 hydrocarbon such as butadiene-1,3, isoprene, 2,3-dimethyl butadiene-1,3, piperylene, 2-ethyl butadiene-1,3, 2-phenyl butadiene-1,3 and the like either alone or in admixture in any suitable proportion with each other or with one or more other unsaturated polymerizable compounds copolymerizable therewith in aqueous emulsion. Compounds copolymerizable with butadiene-1,3 hydrocarbons are generally compounds of the structure $>C=C<$ wherein from two to three of the disconnected valences are attached to hydrogen atoms, and are preferably compounds of this $>C=C<$ structure wherein additionally, at least one of the disconnected valences is attached to an electronegative group such as chlorine, cyano or organic groups comprising a plural linkage such as aryl groups, groups containing a

structure, a $-C\equiv C-$ structure, a $>C=C<$ structure or the like. Such compounds include, in addition to other butadiene-1,3 hydrocarbons, other conjugated dienes of the general structure

wherein at least two of the disconnected valences are attached to hydrogen and at least one is attached to a similar

group such as chloroprene, 2-cyano butadine-1,3, cyclopentadiene, myrcene and the like and monoolefinic copolymerizable compounds (compounds containing a single olefinic double bond present in the structure $>C=C<$ wherein from two to three of the disconnected valences are attached to hydrogen, and particularly those containing a single olefinic double bond present in a $CH_2=C<$ structure wherein at least one of the disconnected valences is attached to an electronegative group) such as styrene, vinyl naphthalene, para-chloro styrene, para-methoxy styrene, alpha-methyl styrene and other aryl olefins having an aryl group attached to a carbon atom of a $>C=C<$ group; acrylonitrile, methacrylonitrile, alpha-chloro acrylonitrile, methyl acrylate, methyl methacrylate, methallyl methacrylate, methyl alpha-chloro acrylate, acrylic acid, acrylamide, methacrylamide and other polymerizable acrylic compounds possessing a $CH_2=C<$ group; vinyl ketone, acrolein, methyl isopropenyl ketone, methyl vinyl ether, methyl ethynyl carbinol, diethyl fumarate, diallyl maleate, vinyl acetate, vinyl pyridine, vinylidene chloride, isobutylene and other monoolefinic unsaturated hydrocarbons, ethers, acids, alcohols, aldehydes, ketones, and esters of the character described. When mixtures of butadiene-1,3 hydrocarbons with such copolymerizable compounds are employed it is preferable that the butadiene-1,3 hydrocarbon be present in a predominant amount, that is, to the extent of at least 50% by weight of the mixture.

Numerous other modifications and variations in the method hereinabove described will occur to those skilled in the art and are within the spirit and scope of the invention as defined in the appended claims.

I claim:

1. In the process of producing synthetic rubber by the polymerization of a monomeric material predominantly containing a butadiene-1,3 hydrocarbon in an aqueous emulsion containing a water-soluble persulfate in an amount sufficient to initiate the polymerization and an emulsifying agent yielding an acidic emulsion, said emulsifying agent being a water-soluble salt of an organic base containing a hydrocarbon chain of 8 to 24 carbon atoms, the improvement which consists in carrying out the polymerization in the additional presence of from 0.01 to 2.0%, based on the weight of the monomeric material, of aluminum chloride whereby precoagulation during polymerization is substantially prevented and a fluid latex containing a synthetic rubber of improved quality is obtained.

2. In the process of producing synthetic rubber by the polymerization in aqueous emulsion of a monomeric mixture of butadiene-1,3 with a lesser amount of a compound copolymerizable therewith in aqueous emulsion, in the presence of a water-soluble persulfate in an amount sufficient to initiate the polymerization and an emulsifying agent yielding an acidic emulsion, said emulsifying agent being a water-soluble acid salt of an aliphatic amine containing an aliphatic chain of 8 to 24 carbon atoms, the improvement which consists in carrying out the polymerization in the additional presence of from 0.01 to 2.0%, based on the weight of the monomeric mixture, of aluminum chloride whereby precoagulation during polymerization is substantially prevented and a fluid latex containing a synthetic rubber of improved quality is obtained.

3. In the process of producing synthetic rubber by the polymerization of a monomeric mixture of butadiene-1,3 with a lesser amount of styrene in an aqueous emulsion containing a water-soluble persulfate in an amount sufficient to initiate the polymerization and, as the emulsifying agent, lauryl amine hydrochloride, the improvement which consists in carrying out the polymerization in the additional presence of from 0.01 to 0.5%, based on the weight of the monomeric mixture, of aluminum chloride whereby precoagulation during polymerization is substantially prevented and a fluid latex containing a synthetic rubber of improved quality is obtained.

CHARLES F. FRYLING.

REFERENCES CITED

The following references are of record in the file of this patent:

UNITED STATES PATENTS

| Number | Name | Date |
|---|---|---|
| 1,935,733 | Tschunkur | Nov. 21, 1933 |
| 2,217,632 | Wolfe | Oct. 8, 1940 |
| 2,232,515 | Arnold | Feb. 18, 1941 |
| 2,234,076 | Gumlich | Mar. 4, 1941 |
| 2,281,613 | Wollthan | May 5, 1942 |
| 2,305,025 | Muhlhausen | Dec. 15, 1942 |
| 2,306,411 | Schoenfeld | Dec. 29, 1942 |
| 2,397,146 | Kellog | Mar. 26, 1946 |